(12) United States Patent
Agesen et al.

(10) Patent No.: US 8,875,162 B2
(45) Date of Patent: *Oct. 28, 2014

(54) EFFICIENT VIRTUALIZATION OF INPUT/OUTPUT COMPLETIONS FOR A VIRTUAL DEVICE

(71) Applicant: VMware, Inc., Palo Alto, CA (US)

(72) Inventors: Ole Agesen, Menlo Park, CA (US);
Boris Weissman, Palo Alto, CA (US);
Keith Adams, San Carlos, CA (US);
Jennifer-Ann M. Anderson, Los Altos Hills, CA (US); Maxime Austruy, Saint-Sulpice (CH)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,442

(22) Filed: Aug. 9, 2013

(65) Prior Publication Data

US 2013/0326518 A1 Dec. 5, 2013

Related U.S. Application Data

(63) Continuation of application No. 12/968,039, filed on Dec. 14, 2010, now Pat. No. 8,533,745, which is a continuation of application No. 11/066,363, filed on Feb. 25, 2005, now Pat. No. 7,853,960.

(51) Int. Cl.
| | |
|---|---|
| *G06F 9/44* | (2006.01) |
| *G06F 9/455* | (2006.01) |
| *G06F 9/48* | (2006.01) |
| *G06F 9/46* | (2006.01) |

(52) U.S. Cl.
CPC ........ *G06F 9/45508* (2013.01); *G06F 9/45558* (2013.01); *G06F 2009/45579* (2013.01); *G06F 9/4825* (2013.01)
USPC .......................................... 719/324; 718/100

(58) Field of Classification Search
None
See application file for complete search history.

(56) References Cited

U.S. PATENT DOCUMENTS

| | | | |
|---|---|---|---|
| 5,371,857 | A | 12/1994 | Takagi |
| 6,353,869 | B1 | 3/2002 | Ofer et al. |
| 6,353,898 | B1 | 3/2002 | Wipfel et al. |
| 6,434,630 | B1 | 8/2002 | Micalizzi, Jr. et al. |
| 6,487,652 | B1 | 11/2002 | Gomes et al. |
| 6,754,738 | B2 | 6/2004 | Brice, Jr. et al. |
| 6,904,517 | B2 | 6/2005 | Nevill et al. |
| 7,039,691 | B1 | 5/2006 | Turnidge |
| 2003/0177179 | A1 | 9/2003 | Jones et al. |
| 2006/0010440 | A1 | 1/2006 | Anderson et al. |
| 2006/0085792 | A1 | 4/2006 | Traut |

*Primary Examiner* — H S Sough
*Assistant Examiner* — Abdou Seye

(57) ABSTRACT

Completion interrupts corresponding to I/O requests issued by a virtual machine guest, which runs on a host platform, are virtualized in such a way that I/O completion interrupts to the requesting guest are delivered no faster than it can stably handle them, but, when possible, faster than the nominal speed of a virtual device to which a virtual machine addresses the I/O request. In general, completion events received from the host platform in response to guest I/O requests are examined with respect to time. If enough time has passed that the virtual device would normally have completed the I/O request, then the completion interrupt is delivered to the guest. If the nominal time has not elapsed, however, the invention enqueues and time-stamps the event and delivers it at the earliest of a) the normal maturity time, or b) at a safepoint.

16 Claims, 5 Drawing Sheets

EFFICIENT VIRTUALIZATION OF INPUT/OUTPUT COMPLETIONS FOR A VIRTUAL DEVICE

CROSS-REFERENCE TO RELATED APPLICATION

This application is a Continuation of pending U.S. patent application Ser. No. 12/968,039, filed 14 Dec. 2010, issued as U.S. Pat. No. 8,533,745; which is a Continuation of pending U.S. patent application Ser. No. 11/066,363, filed 25 Feb. 2005, which has issued as U.S. Pat. No. 7,853,960.

BACKGROUND OF THE INVENTION

1. Field of the Invention

This invention relates generally to computer virtualization and, in particular, to a method and system for efficiently virtualizing completions of input/output events by a virtual device.

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete," isolated computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is an abstraction—a "virtualization"—of an actual physical computer system. FIG. 1 shows one possible arrangement of a computer system 700 that implements virtualization. A virtual machine (VM), which in this system is the guest 200, is installed on a "host platform," or simply "host," which will include a hardware platform 100 and one or more layers or co-resident components comprising system-level software, such as an operating system or similar kernel, or a virtual machine monitor or hypervisor (see below), or some combination of these.

Each VM 200 will typically have both virtual system hardware and guest system software. The virtual system hardware typically includes at least one virtual CPU 210, virtual system memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

If the VM 200 is properly designed, applications 260 running on the VM will function the same as they would if run on a "real" computer, even though the applications are running indirectly, that is via the guest OS 220 and virtual processor(s) 210. Executable files will be accessed by the guest OS from the virtual disk 240 or virtual memory 230, which will simply be portions of the actual physical disk 140 or memory 130 allocated to that VM. Once an application is installed within the VM, the guest OS retrieves files from the virtual disk just as if the files had been pre-stored as the result of a conventional installation of the application. The design and operation of virtual machines are well known in the field of computer science.

Some interface is usually required between a VM 200 and the underlying host platform (in particular, the hardware CPU(s) 110), which is responsible for actually executing VM-issued instructions and transferring data to and from the hardware memory 130 and storage devices 140. A common term for this interface is a "virtual machine monitor" (VMM), shown as component 300. A VMM is usually a software component that runs directly on top of a host, or directly on the hardware, and virtualizes at least some of the resources of the physical host machine so as to export some hardware interface to the VM.

The various virtualized hardware components in the VM, such as the virtual CPU(s) 210, the virtual memory 230, the virtual disk 240, and the virtual device(s) 270, are shown as being part of the VM 200 for the sake of conceptual simplicity. In actuality, these "components" are usually implemented as emulations included in the VMM. One advantage of such an arrangement is that the VMM may be set up to expose "generic" devices, which facilitate VM migration and hardware platform independence.

In fully virtualized systems, the guest OS 220 cannot determine the presence of the VMM 300 and does not access hardware devices directly. One advantage of full virtualization is that the guest OS may then often simply be a copy of a conventional operating system. Another advantage is that the system provides complete isolation of a VM 200 from other software entities in the system (in particular, from other VMs), if desired. Because such a VM (and thus the user of applications running in the VM) cannot usually detect the presence of the VMM, the VMM and the VM may be viewed as together forming a single virtual computer.

In contrast to a fully virtualized system, the guest OS in a so-called "paravirtualized" system is modified to support virtualization, such that it not only has an explicit interface to the VMM, but is sometimes also allowed to access at least one host hardware resource directly. In short, virtualization transparency is sacrificed to gain speed or to make it easier to implement the VMM that supports the para-virtualized machine. In such para-virtualized systems, the VMM is sometimes referred to as a "hypervisor."

In addition to the distinction between full and partial (para-) virtualization, two arrangements of intermediate system-level software layer(s) are in general use—a "hosted" configuration and a non-hosted configuration (which is shown in FIG. 1). In a hosted virtualized computer system, an existing, general-purpose operating system forms a "host" OS that is used to perform certain input/output (I/O) operations, alongside and sometimes at the request of the VMM. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In many cases, it may be beneficial to deploy VMMs on top of a software layer—a kernel 600—constructed specifically for this purpose. This configuration is frequently referred to as being "non-hosted." Compared with a system in which VMMs run directly on the hardware platform, use of a kernel offers greater modularity and facilitates provision of services (for example, resource management) that extend across multiple virtual machines. Compared with a hosted deployment, a kernel may offer greater performance because it can be co-developed with the VMM and be optimized for the characteristics of a workload consisting primarily of VMMs. The kernel 600 also handles any other applications running on the kernel that can be separately scheduled, as well as any temporary "console" operation system 420, if included, used for booting the system as a whole and for enabling certain user interactions with the kernel.

Note that the kernel 600 is not the same as the kernel that will be within the guest operating system 220—as is well known, every operating system has its own kernel. Note also that the kernel 600 is part of the "host" platform of the VM/VMM as defined above even though the configuration shown in FIGS. 1 and 2 is commonly termed "non-hosted." The difference in terminology is one of perspective and definitions that have evolved in the art of virtualization.

Performance Considerations with Device Emulation

In a VM environment, such as within the VM 200 of FIG. 1, the functionality of a physical device is emulated. The device emulation may or may not rely on the "real" presence of the corresponding physical device within the hardware system 100. For example, the VMM 300 of FIG. 1 may include a device emulator 330 that emulates a standard Small Computer System Interface (SCSI) disk such that the virtual disk 240 appears to the VM 200 to be a standard SCSI disk connected to a standard SCSI adapter, although the underlying actual device 140 is another type of physical hardware, such as an IDE hard disk. In this case, a standard SCSI driver is installed into the guest operating system 220 as one of the drivers 224. The device emulator 330 then interfaces with the driver 224 and handles disk operations for the VM 200. The device emulator 330 converts the disk operations from the VM to corresponding disk operations for the physical disk 140. As other examples, CDROM emulation or floppy drive emulation may manipulate image files that are stored on the physical disk 140.

The drivers 224 within the VM 200 will usually be subject to the same limitations as the drivers within a computer system that does not employ virtualization. For example, device drivers for commercial operating systems are often developed under severe market pressure. The purpose of the driver software is to drive target hardware devices installed in the common computer systems available at the time of driver development. Most drivers perform their tasks well, but typically lack any "unnecessary" generalities, so that the device typically cannot perform significantly faster than the initial target speed. In fact, the device may not perform correctly when running on an unusually fast or unusually slow processor. Therefore, when a faster hardware device or faster processor becomes available, it is shipped with a new driver version.

To release CPU resources during the performance of I/O events, most peripheral devices have evolved to operate in an asynchronous interrupt-driven fashion. A processor thus initiates an I/O operation by writing device-specific values into device registers. In FIG. 1, for example, a CPU 110 will initiate an I/O operation for a peripheral device 170 by writing the device-specific values into the device registers. The processor can then operate with respect to other tasks that do not depend on the completion of the pending I/O operation. The device 170 then carries out the specific task and interrupts the processor upon reaching I/O completion. Then, the device driver again takes over and performs the necessary post-completion software tasks. The operating system eventually arranges for the requesting process to obtain the newly received data. The same sequence of events will occur within the VM 200, where the virtual CPU(s) 210 cooperate with the corresponding driver 224 and the guest operating system 220 to control virtual I/O events for a virtual device 270.

A driver 224 of a device 270 implements a state machine to drive the underlying device. State transitions of the state machine rely on the physical characteristics of the device. Both device latencies and throughputs must be modeled accurately in order to ensure reliable operation of the driver in the guest OS 220. If virtual hardware exhibits vastly different timing characteristics than the physical hardware for which the driver was developed and tested, the driver may malfunction, which would affect the reliability of the entire guest OS. For instance, an access time of an ATAPI IDE CDROM may be 75 milliseconds (ms) to 100 ms. The CDROM emulation may, however, actually be accessing data stored on a device such as a hard drive (disk 140) with an access time ten times faster than that of the emulated device. (In these cases, the device that actually stores the data is said to "back" the virtual device.) The original (physical) CDROM device parameters must then be preserved to ensure the correct operation of the CDROM driver in the guest operating system.

FIG. 4 illustrates this point: Assume the same example, namely, that the VM is configured with a virtual CDROM device 270, which will correspond to (that is, be a virtualization of) some physical CDROM device 170. When the VM makes an I/O request directed to the virtual CDROM device, it is in fact requesting some data stored on (or to be written to) what it believes is a "real" CDROM disk 171, but is in fact simply a software construct corresponding to a physical CDROM disk. As long as the VM gets the data that would have been on the physical CDROM disk 171, in the expected format, then the VM does not need to know that the data in fact is coming from the backing device, which, in the illustration, is the hardware disk 140. Consequently, the data assumed to be contained on the physical CDROM disk 171 need not be on a medium in a physical drive at all; in fact, it is not even necessary for the physical CDROM disk 171 ever to have existed, as long as the data such a CDROM disk would hold is stored and made available to the VM in the correct form. Rather, the data on the assumed physical CDROM disk can be stored, for example, as an ISO image file 141, in the backing device, such as disk 140, or possibly even cached in memory.

When the VM issues an I/O request to the virtual CDROM device 270, the VMM, in cooperation with the host, will convert this I/O request into a corresponding I/O request against the backing device. For example, an I/O request issued to the virtual CDROM drive 270 could be converted into a file request against the ISO image file 141 on the physical hard disk 140. Now assume that an I/O request takes 80 ms to complete using the assumed physical CDROM drive 170. The guest OS will then assume that any I/O request it issues to the virtual CDROM drive 270 will also take 80 ms to complete. Assume, however, that the access time for requested information in the ISO image file 141 on the physical hard disk (or other backing device) is only 8 ms.

Thus, a physical CDROM drive 170 would be relatively slow; the VM thinks that the virtual CDROM drive 270 is equally slow; but the actual backing device used to complete I/O requests is much faster. This means that it would be possible to complete the I/O request in only 8 ms, since there is no actual need to retrieve anything from a physical CDROM disk 171 on a physical CDROM drive 170. The problem is that many drivers cannot accept the I/O completion interrupt that early.

Stated more generally, a backing device that completes an I/O event too soon with respect to the anticipated-driver/processor speed may interfere with the on-going driver state transitions of the state machine being implemented by the driver. In the common case, this could result in interrupting driver code while it is not ready to handle an incoming device interrupt, which in turn might lead to data corruption and/or driver malfunction. A similar problem exists when consecutive interrupts are delivered too close in time, since the driver may not be able to recover from servicing the previous interrupt when the subsequent interrupt arrives.

One solution to the interrupt timing problem in the VM context is to place completion interrupts for the completed I/O events that arrive at the faster hardware speed into a delay queue, which can then be used to impose the speed of the relatively slower emulated device. The slower speed is imposed by draining the delay queue at a rate that is consistent with that of the slower emulated device. For instance, continuing with the example above, while emulating a virtual CDROM access, the data may be read from an IDE hard disk backing device within 8 ms. The corresponding I/O completion event will then stay in the delay queue for at least 72 ms, for a total completion time of at least 80 ms, in order to match the virtual CDROM access time. To avoid spinning, the delay queue may be examined after each timer interrupt interval to identify I/O completion events that can be forwarded to the guest operating system.

While the above-described technique operates well for its intended purposes, it is desirable to allow physical device emulation to scale with any advances in the underlying host platform, while maintaining the stability of the guest operating system. It is also desirable to enable virtual devices to outperform the corresponding physical hardware being emulated, if this can be achieved without destabilizing the guest operating system. In other words, existing solutions to this problem essentially force advanced or faster technology to simulate less advanced, slower technology so as not to "outrun" the latter—the greater the difference in latency between the two, the greater is the "waste." For example, the disadvantage of forced delay is particularly apparent in the context of low latency devices, such as network interface cards (NICs)—Such devices may require smaller delays, on the order of microseconds as compared to the approximately 80 millisecond delay of a CDROM.

Because of the finite host timer resolution of typical VM architectures, the actual average minimal delay will be related to the timer interrupt interval. As a result, there may be a negative impact on the performance of the emulated device. For example, the events corresponding to the arrival of network packets will be communicated to the guest with a latency on the order of milliseconds, instead of microseconds. Increasing the host timer resolution to reduce this latency may be difficult in the hosted context and is likely to adversely affect overall performance when the timer interrupt rate becomes too high.

SUMMARY OF THE INVENTION

The invention exploits the ability to identify discrete times when a processor of a uni-processor or multi-processor virtualization system reaches a condition that indicate that it can accept early delivery (i.e., pre-scheduled delivery) of an input/output (I/O) completion interrupt.

The invention is applicable in any computer system that includes at least one virtual machine, which may be fully or only partially (para-) virtualized, which runs as a guest on a host hardware platform via an intermediate software layer such as a virtual machine monitor or hypervisor, which has a guest operating system and at least one virtual processor, and which submits I/O requests to at least one virtual device that corresponds to a physical device. The invention provides a method for virtualizing I/O completions by the virtual device that includes backing the virtual device with a backing device such as a hard disk, system, cache, or flash memory, etc.

Timing constraints of the physical device are determined, including a nominal I/O completion delay time, and optionally by modeling device latencies and throughputs. Timing parameters for scheduling deliveries of completion interrupts during emulation of the physical device are also defined, including at least partially basing the timing parameters on the timing constraints of the physical device. An actual I/O completion interrupt is detected from the backing device. If a nominal maturity time has elapsed since the virtual I/O request, the interrupt is delivered as usual to the virtual machine. If the nominal maturity time has not yet elapsed, however, but the virtual machine is at a safepoint, that is, a point of execution of the virtual processor that indicates that the virtual processor is in a condition to receive an I/O completion interrupt, then the I/O completion interrupt is delivered anyway, either to the virtual processor that initiated the underlying I/O request, or to whichever virtual processor the existing software or virtual hardware determines should take the interrupt. The invention thus enables device emulation acceleration relative to limiting deliveries of said completion interrupts to a schedule that is based on said timing parameters alone.

In the preferred embodiment of the invention, a local delay queue is established for each virtual processor (one or more). Each local delay queue holds time-stamped indications of completed I/O requests by the backing device. A global delay queue, or a scanning routine that examines the local delay queue(s), is included to determine a most mature completed I/O request across all the local delay queues.

According to an optional aspect of the invention, if any of the virtual processors has reached an interrupt safepoint after a scheduled time for delivery of a particular completion interrupt but before said particular completion interrupt is dispatched from said global delay queue, then the respective local delay queue is respaced with respect to time accordingly.

The invention may use any or any combination of different methods to determine that a virtual processor has reached a safepoint. As one example, where the virtual machine executes in different execution modes, including a guest OS kernel mode and a user mode, the invention detects the safepoint by sensing a transition in the guest between execution modes. Other examples include detecting when the kernel of the guest operating system enters an idle loop, or writes to emulated interrupt circuitry or to an emulated priority register.

Para-virtualized virtual machines may be specifically modified to support the invention by indicating safepoints. For example, the guest operating system may be provided with a mechanism for actively indicating that the virtual processor is at a safepoint.

In implementations in which the intermediate software layer processes virtual machine instructions using binary translation, a special code sequence of one or more instructions indicating a safepoint is emitted at the beginning or end of the code sequence that emulates the instructions. The presence of a safepoint may then be detected simply by detecting that the code sequence is being executed.

An advantage of the invention is that the method and system enable virtual device emulation to scale with advances in the underlying host platform without sacrificing guest stability. Moreover, it is possible for the virtual devices to outperform the corresponding legacy hardware without destabilizing the guest operating system.

DETAILED DESCRIPTION

The main idea of this invention is to deliver I/O completion interrupts to the requesting guest no faster than it can stably handle them, but, when possible, to deliver them faster than the nominal speed of the virtual device to which a virtual machine addresses the I/O request. In general, completion events received from the host platform in response to guest I/O requests are examined with respect to time. If enough time has passed that the virtual device would normally have completed the I/O request, then the completion interrupt is delivered to the guest. If the nominal time has not elapsed, however, the invention enqueues and time-stamps the event and delivers it at the earliest of a) the normal maturity time, or b) at a safepoint. These concepts are explained in greater detail below.

Figure 1:
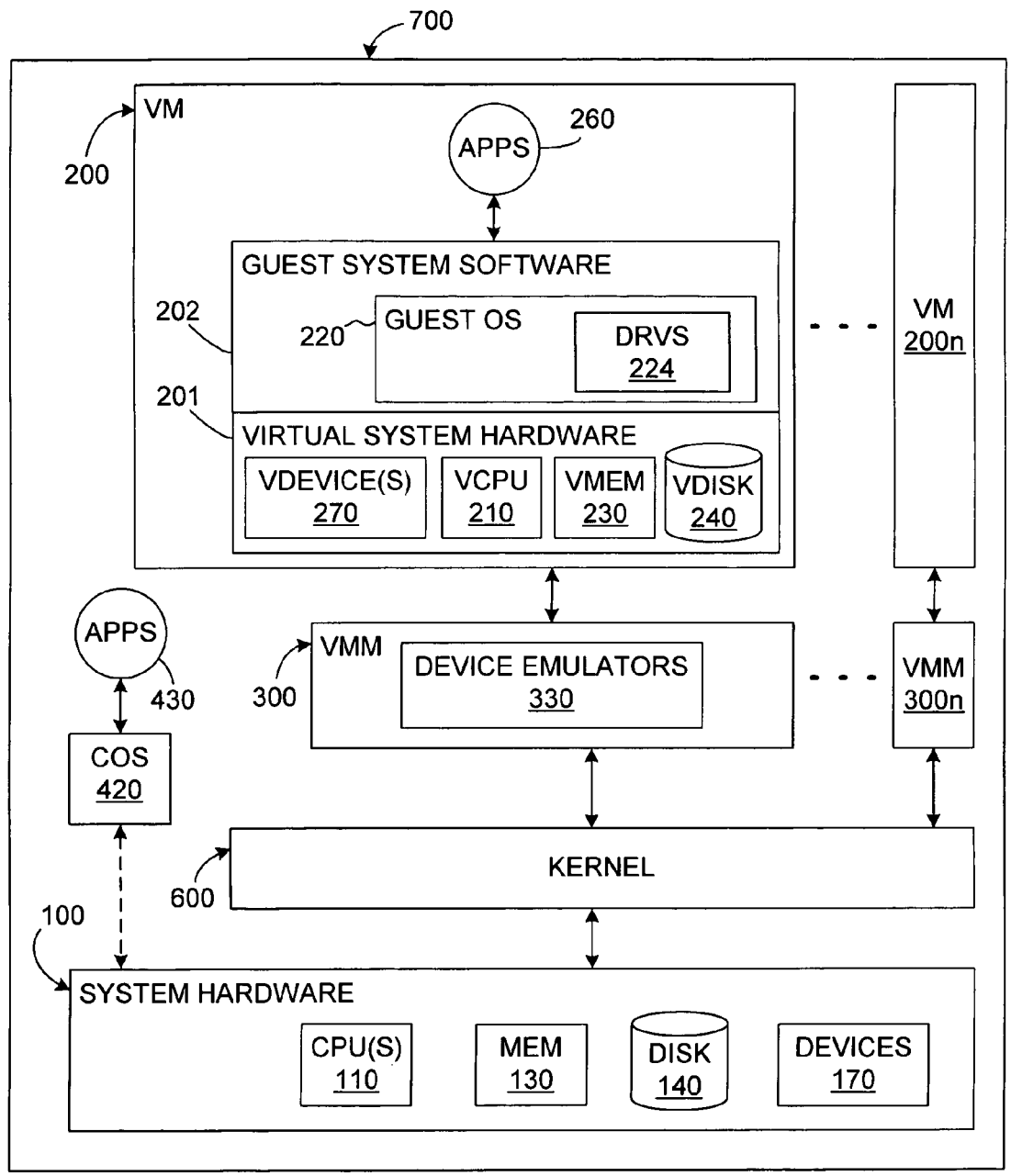
FIG. 1 is a block diagram of one example of a virtualization system in which the invention may be advantageously included.
Figure 2:
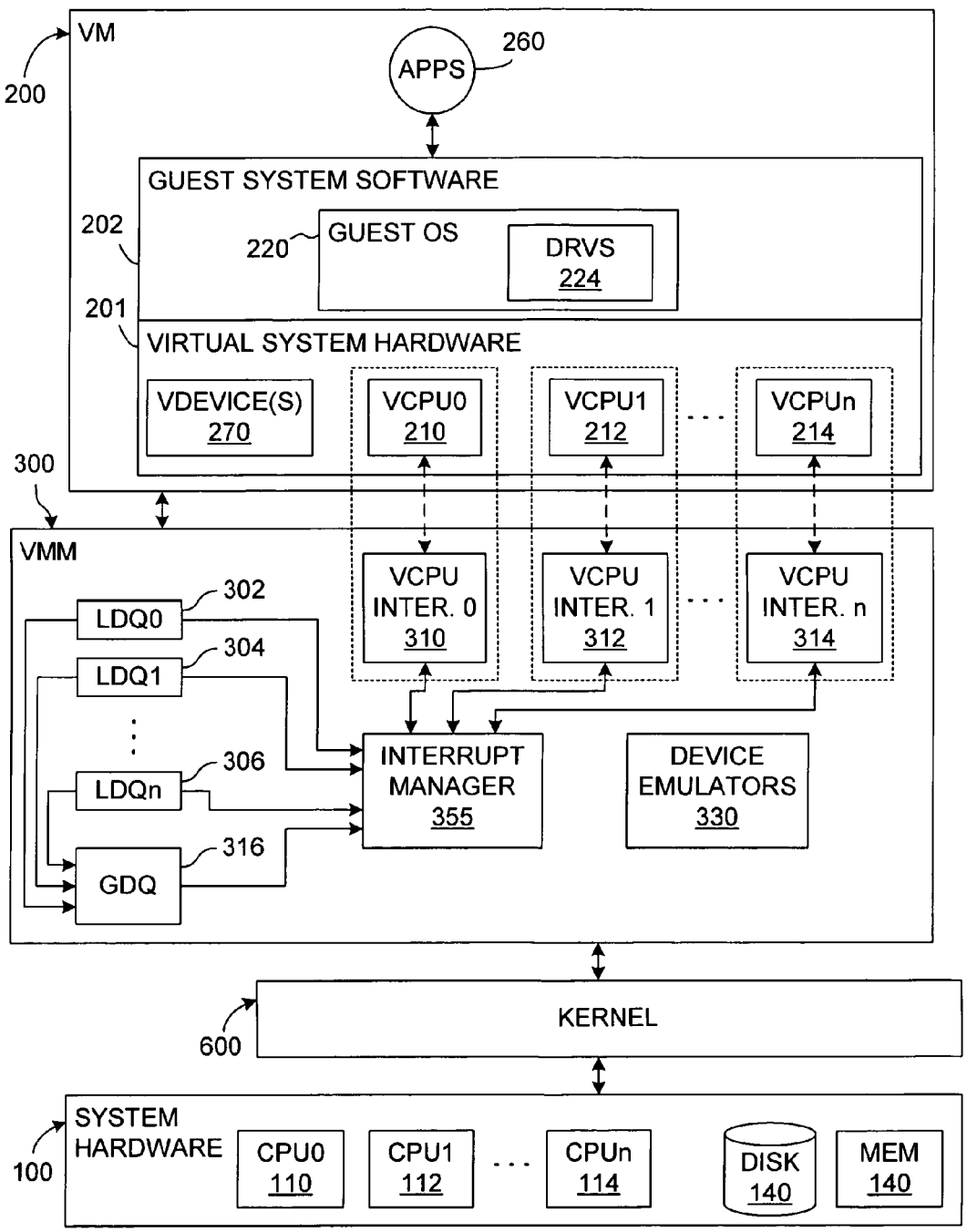
FIG. 2 is a block diagram of the system of FIG. 1, but with an emphasis on components which may be used to provide one implementation of a multi-processor, multi-queue implementation of device emulation in accordance with the invention.

FIG. 2 illustrates one example of a virtualization system 700 that includes the invention. As will be understood from the discussion above, FIG. 2 illustrates a non-hosted system; however, the principles apply equally to provide efficient virtualization of device I/O completions within a hosted environment. Thus, the kernel 600 may reside between the VMM 300 and the system hardware 100 (as shown in FIGS. 1 and 2), or the host operating system 420 may function as an intermediate between the VMM and the system hardware, or the VMM may be at the same system level as the host operating system. Moreover, while the invention is well suited for use in multi-processor systems such as shown in FIG. 2, the principles of the invention may be applied to uni-processor systems as well, and the virtual machines supported by the VMM may be fully or incompletely (para-) virtualized. Of interest to the execution of the invention is that the environment be one in which it is desirable to enable emulation of a physical device to scale with advances in the underlying platform, without sacrificing stability.

In the embodiment of FIG. 2, a virtual device 270 or devices are implemented within the VM 200 using a number (again, which may be one) of virtual CPUs, including VCPU0 210, VCPU1 212, and VCPUn 214. Although not required, the number of virtual CPUs is shown as matching the number of physical CPUs 110, 112 and 114. While this correspondence has advantages relative to other multi-processor architectures, it is not critical to the invention.

If there are more virtual processors 210, 212 and 214 than there are physical processors 110, 112 and 114, a conventional time-sharing routine can be included within the VMM 300 (or host operating system, depending on which software layer provides the direct interface with the hardware) to distribute physical CPU time among the various virtual processors. Conversely, if there are more physical processors than virtual processors, the excess physical processor(s) may simply be allowed to idle or to run other VMMs or programs.

While references are made to the virtual CPUs 210, 212 and 214 running on a corresponding physical CPU 110, 112 and 114, this does not literally occur. Rather, by definition, each virtual CPU is merely a software construct that interacts with other components of the VM 200 and VMM 300 as if the VCPU were a physical CPU. An interface corresponding to an actual physical CPU is therefore exported to each virtual CPU by a respective subsystem in the VMM. To this end, the VMM is shown as including a number of virtual CPU interface modules 310, 312 and 314 that act as dedicated interfaces for the respective virtual processors. As needed, each module 310, 312 and 314 may also halt and/or resume execution of its corresponding VCPU and may change the virtual state of the VCPU.

Each virtual CPU 210, 212, . . . , 214 and its respective CPU module 310, 312, . . . , 314 can thus be considered to form a single functional software module that emulates a CPU, as is indicated in the figure by the dotted line surrounding and connecting each pair. In practice, the only difference is one of perception: The VM views the exposed interface as being a virtual CPU whereas, in analyzing the structure of the VMM, each CPU module is just the interface exposed to the VM—all instructions must of course ultimately be executed on some physical CPU. From the perspective of the kernel or other system software layer, each virtual CPU is simply a thread of execution.

The modules 310, 312 and 314 are connected to an interrupt manager 355, which is shown as residing solely within the VMM 300, but which may be partially or even entirely within the system hardware 100 or some other system software layer or component. The interrupt manager cooperates with other components to control the queuing, dequeuing, and delivery of virtual completion interrupts. Note that, in response to the interrupt, the driver of the virtual device will determine whether or not the requested I/O operation completed successfully—"completion" of an I/O event does not necessarily connote success. The interrupt manager may be implemented in software, that is, a body of computer-executable code, or a combination of hardware and software. Although the interrupt manager 355, the virtual CPU modules 310, 312, 314, and, indeed, the VMM itself, are shown in the figures as being separate software entities, or sub-entities, this is merely for ease of understanding and conceptual simplicity—in practice, from the perspective of the hardware processor that actually executes instructions of the VMM and a virtual CPU (usually, a one-to-one mapping between virtual and physical CPUs), all of these entities and sub-entities are simply a thread of control.

The interrupt manager 355 is shown as being coupled to a number of local delay queues 302, 304 and 306. Each local delay queue is uniquely associated with a different VCPU 210, 212 and 214. Thus, the first local delay queue 302 may be dedicated to VCPU 210, the second local delay queue 304 may be dedicated to the VCPU 212, and the last local delay queue 306 may be dedicated to the last VCPU 214. In addition to the local delay queues, the interrupt manager is coupled to a global delay queue 316. The operations of the delay queues will be described in detail below. While the delay queues 302, 304, 306 and 316 are shown as being components of the system, persons skilled in the art will readily recognize that the delay queues are standard data structures, that is, software constructs. Furthermore, it would also be possible to implement the invention without the global queue 316, but to extract the necessary information using a software routine—a global queuing module—that scans the local queues' elements whenever it would be time to examine the global queue.

The invention efficiently virtualizes I/O completions from all manner of devices, both those traditionally viewed as "peripherals," such as, for example, network and disk access devices, and those more closely tied to the system hardware, such as, for example, APICs and timers. The invention also does not assume that "I/O" necessarily implies any data transfer between the requesting entity and the device. For example, an instruction to a dedicated co-processor to perform some calculation or to cause some interaction between two processors also involves an input (the instruction) and some form of output (such as storing the result in a register). The only assumption is that the request is processed asynchronously, with generation of a completion interrupt to the requesting entity.

Solely by way of continuing the example introduced above, the invention is described here primarily in the context of a common CDROM device. Changes to the illustrated embodiment to accommodate implementations of the invention in other contexts will be obvious to those skilled in system-level software development.

Figure 4:
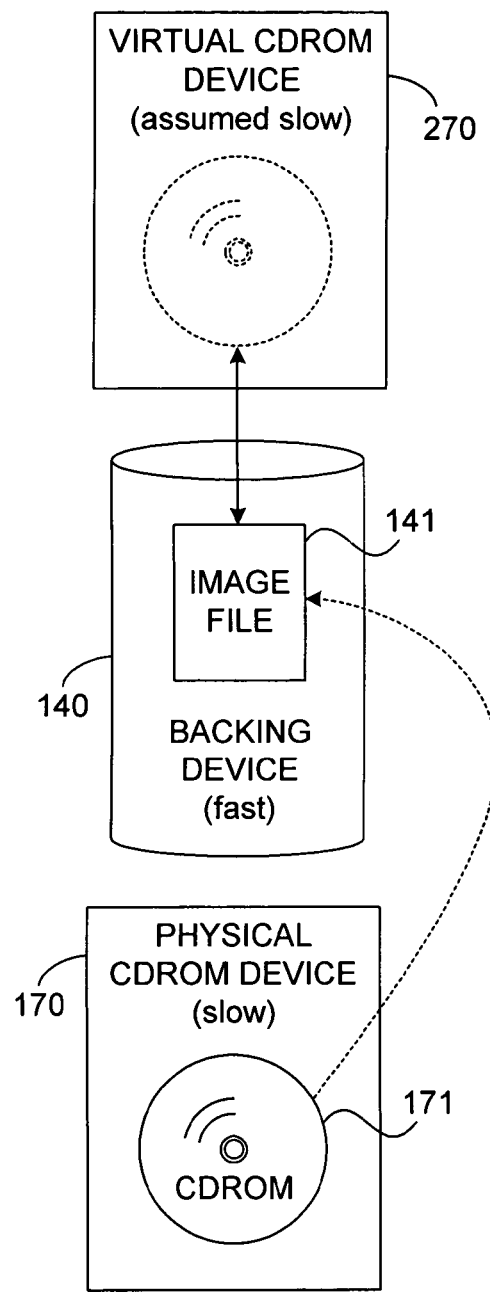
FIG. 4 illustrates how a virtual device, which corresponds to a physical device, may be implemented using a faster backing device.

A physical device such as a CDROM may be emulated as a virtual device 270 by providing the proper driver 224 and device emulator module 330. The cooperation of the VM 200 and VMM 300 defines a sequence of I/O events to be performed. Moreover, a timing schedule for delivering completion interrupts indicative of completions of the I/O events can then be established. For example, continuing the example above, the virtual CDROM device 270 (FIG. 4) may be defined as having an I/O event completion time of 80 ms. As explained above, this completion time is based upon the physical characteristics of the device being emulated, rather than upon actual performance availability. That is, while the virtual CDROM device 270 may be accessing data stored (for example, as the ISO image file 141) on a backing device with an access time that is ten times faster than that of the actual physical device 170 that is being emulated, the timing schedule is established using the standards of the physical device 170.

In the illustrated example, the backing device is the physical hard disk 140. Other backing devices may be used. As just some of the different examples, the backing device could be the system memory 130, or a dedicated cache, or even a separate memory device such as a flash memory stick or card. Indeed, the backing "device" need not even be a storage device at all, but rather could be a software emulation of its own, or even a software module such as a program that creates the data needed to complete I/O requests as needed. This invention may be used regardless of the type of backing device, as long as the virtual machine is able to maintain the assumption that it is the virtual device that is completing the requested operations.

Figure 3:
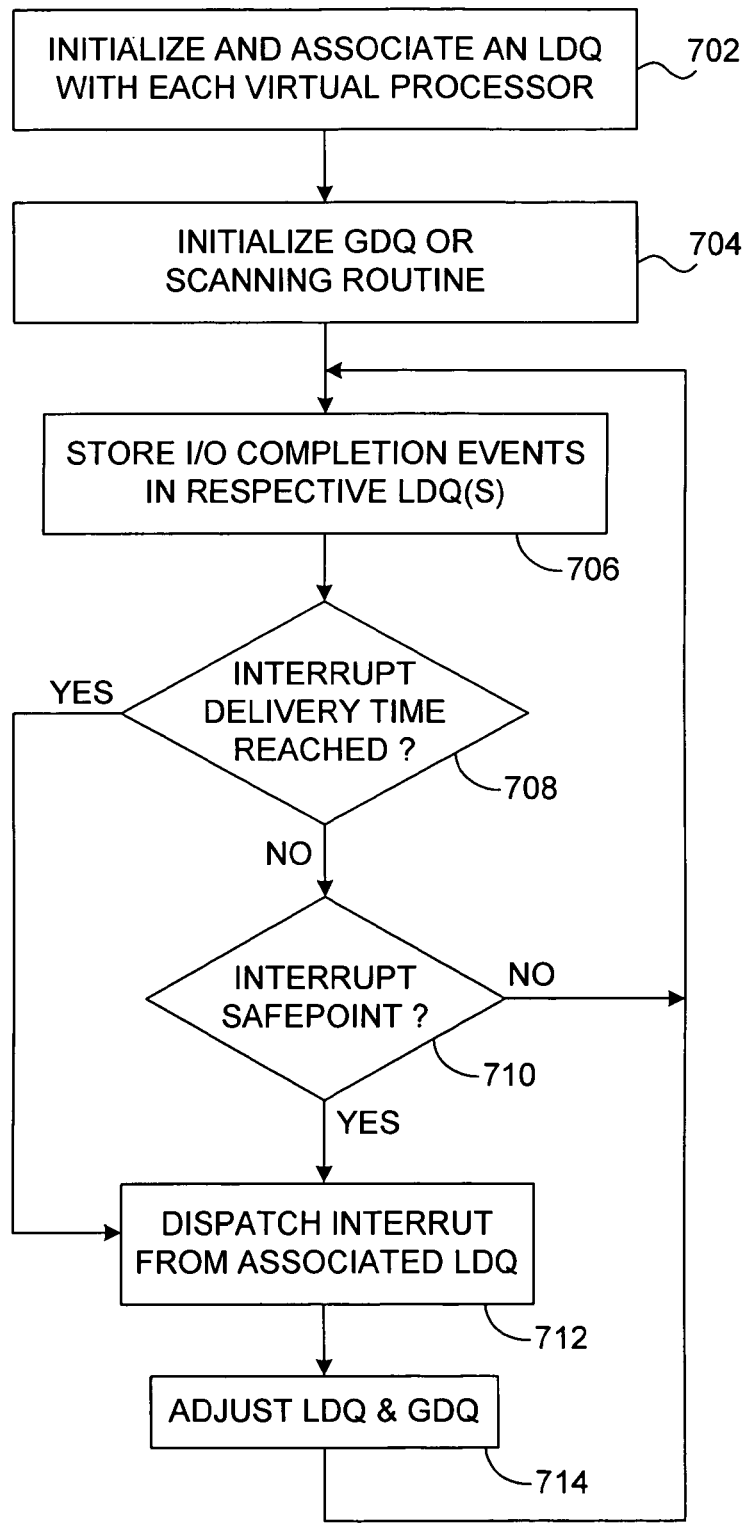
FIG. 3 is flowchart of the main steps implemented by the invention.

FIG. 3 is a flowchart of the main steps followed by the system 700 to use local and global delay queues according to one implemented embodiment of the invention: First, a local delay queue LDQ 302, 304 and 306 is initialized and uniquely associated (step 702) with each respective virtual processor (one or more). These delay queues are "local" in the sense that each VCPU is able to access only its associated local delay queue. Next, a global delay queue 316 is initialized and associated (step 704) with the local delay queue(s). As described below, a scanning routine may replace the global queue. I/O events are then stored in the local queues as they arise (step 706).

Input/output events are preferably sorted in a manner consistent with accurate emulation of the physical device. That is, the events are sorted on the basis of the completion order of I/O events, and are preferably sorted by delivery time, with the "oldest" at the head of each local queue. Each local delay queue contains the completion interrupts for the uniquely associated VCPU. The global delay queue 316 stores the "next" completion interrupt for each local delay queue; alternatively, the global queuing module can scan the head of each local list as needed to determine which completion interrupt is to be processed next.

Consider the following table, which illustrates hypothetical maturity times for seven different I/O events submitted by two virtual CPUs:

TABLE 1

| Event no. | Maturity time (ms) |
|---|---|
| 1 | 10 |
| 2 | 12 |
| 3 | 14 |
| 4 | 5 |
| 5 | 11 |
| 6 | 20 |
| 7 | 22 |

Figure 5:
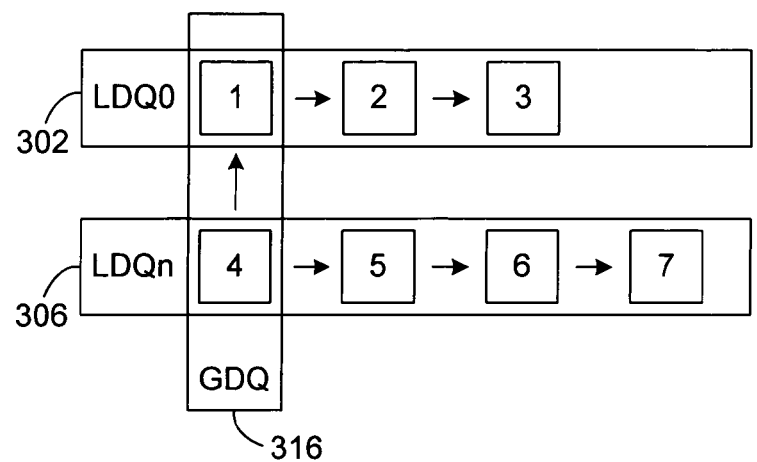
FIG. 5 is a representation of contents of a global delay queue and local delay queues of FIG. 2.

Assume that I/O events 1, 2 and 3 were initiated by virtual CPU 0 and events 4, 5, 6, and 7 were initiated by virtual CPU n. Referring briefly to FIG. 5, each event is inserted within one of the local delay queues with an initial delivery time equal to the I/O initiation time plus any required device delay interval. The global queue will have the next completion interrupts for each of the two illustrated local delay queues. Here, the interrupts for event 1 and event 4 are at the head of the illustrated local delay queues, so that these interrupts are also present within the global delay queue. Given the maturity times shown in the table, event 4 is ahead of event 1, which is why the arrows in the global queue show event 4 at the head of the queue. In the simplest case, with only one VCPU and thus only one local delay queue, the global queue will contain only a single element; the global queue could then be replaced by a simple pointer, or be eliminated altogether (since the local queue's pointer will show the next completion to be processed). Making provision for more than one local delay queue, however, makes the invention more general and allows additional VCPUs to be added without having to fundamentally change the data structure and/or code that defines the global delay queue.

See again FIG. 3: At decision step 708, the interrupt manager 355 determines whether an interrupt maturity time has been reached: the interrupt manager 355 may do this by examining the global delay queue 316 at each scheduled timer interrupt, as well as at other times according to any routine that may be encoded a priori in the manager. If the first I/O event reaches maturity, then the interrupt manager 355 dispatches the corresponding interrupt (step 712) via the appropriate CPU module 310, 312, 314 and VCPU 210, 212, 214 to the VM 200. It then also adjusts the corresponding LDQ and the GDQ accordingly (step 714) by dequeuing the dispatched interrupt event from both queues.

If no event has yet reached its "normal" maturity time, then the manager monitors the VM for the occurrence of a safepoint (step 710; see below for further description). If a safepoint is detected for any virtual CPU, then the next interrupt is dispatched from the corresponding LDQ, which is then adjusted accordingly, along with the GDQ. If no safepoint is detected, then the manager may either continue to monitor the VMs for the occurrence of a safepoint, or store any newly arrived events in the appropriate LDQ, or check whether a normal maturity time has been reached, or preferably continue to do all of these steps.

In multi-processor systems, it is not necessary for the interrupt to be dispatched to the virtual processor that made the underlying I/O request, although this will often be the most common case. Guest kernels will already have some mechanism for handling even random virtual CPU interrupts. Such existing software and/or virtual hardware mechanisms will thus select which virtual processor is to take a dispatched interrupt according to its existing rules. As one example of dispatching a completion interrupt to a non-requesting virtual CPU, the interrupt could be dispatched to a currently idling virtual CPU, or to a virtual CPU whose priority is currently less than that of the requesting VCPU. As another example, the system could be configured such that a particular virtual CPU is assigned to take all I/O completion interrupts, regardless of which virtual CPU initiated the underlying I/O request.

Figure 6:
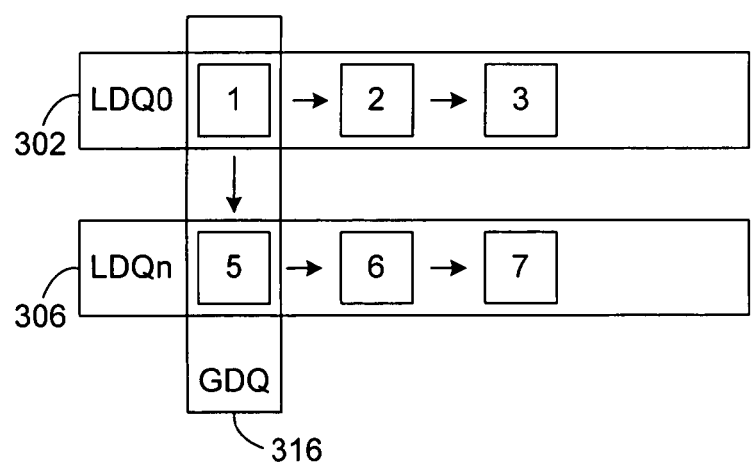
FIG. 6 is a representation of the queues of FIG. 5 following the removal of a completion interrupt for I/O event 4.

Now again consider the example shown by Table 1 above: Given the values in the example table, event 4 will reach maturity first, causing the next interrupt in local delay queue "n" 306 to be delivered. Consequently, the interrupt manager 355 may remove the delivered event from both the local delay queue and the global delay queue. The interrupt manager then enters the interrupt of event 5 into the global delay queue, as shown in FIG. 6 (or to identify event 5 as the head of its local queue if the global "queue" is implemented by a scanning routine). In other words, the completion interrupt for event 5 moves to the head of the local queue LDQn. Since the maturity time for event 5 is later than for event 1, however, event Twill be at the head of the global queue, as illustrated by the direction of the arrows in the illustrated global queue.

As previously noted, some devices and/or drivers have an interrupt spacing constraint. During emulation, the driver 224 will run through a sequence of state transitions upon the I/O completions, and a physical device may have a bandwidth limitation that prevents it from delivering another interrupt while the driver is processing the state transitions. For this reason, there may be a minimum temporal separation (spacing) requirement for consecutive I/O completion interrupts. Because of the finite host timer granularity, the interrupt for event 4, for example, will be dispatched at some time after its initially scheduled time. To preserve the spacing constraint, there may be a need to adjust the delivery time of some pending events of the local delay queue 306 from which the interrupt was dispatched.

One way to accomplish this is for the interrupt manager to iterate over the respective local delay queue 306 and change event delivery times while preserving the order of events. Several different design choices are available for the iteration, with more fine-grained adjustment involving greater complexity. For example, assume that event 4 is delivered at time 5 ms and that a minimum time spacing of 7 ms is required. One simple respacing routine would add 1 ms to the time for event 5 (increasing maturity time from 11 to 12 ms), leave the maturity time for event 6 at 20 ms (since there will still be a 20−12=8 ms spacing), and increase the maturity time for event 7 from 22 to 27 ms. Although this guarantees the minimum separation and correct order with little need for bookkeeping, the increase of the time for event 7 may prove to be unnecessary.

As a more aggressive alternative, the system could adjust the maturity times of as few events as possible under the constraint of preserving order. For example, when event N is delivered, then respacing is applied to event N+1, if needed at all, by the required minimum spacing interval. If this respacing changes the order of event N+1 relative to event N+2, then event N+2 (and subsequent events, as needed) is respaced by at least one time unit (not necessarily the minimum spacing increment), etc.

Regardless of the chosen respacing mechanism (assuming that any is needed at all), the global delay queue is then changed to reflect any changes in order between the local delay queues caused by respacing. Respacing may be done as part of the operation of adjusting the queues as shown as step 714 in FIG. 3, or it may be undertaken at any point where an LDQ is changed.

As mentioned above, if no event has reached maturity, the system according to the invention advances to monitoring and detecting whether an interrupt safepoint has been reached. When one of the VCPUs 210, 212 or 214 reaches an interrupt safepoint (see below), the device emulation code is signaled or otherwise interprets this as indicating that the VCPU is available for processing an I/O completion interrupt "early" with respect to the originally scheduled delivery time of the interrupt.

Referring to FIGS. 3, 5 and 6, if the interrupt manager, via the associated CPU module, determines that the VCPU associated with the nth local delay queue 306 has entered an interrupt safepoint, the completion interrupt for event 4 will be removed from the local and global delay queues. Consequently, the completion interrupt of event 5 becomes the next completion interrupt of the local delay queue 306 and the global delay queue is modified accordingly.

Any or any combination of several different methods may be used to determine whether a particular virtual CPU has reached a safepoint such that a completion interrupt can be dispatched "early," that is, before its nominal maturity time. A state or execution mode transition is one possible indication of a safepoint: the VMM may monitor VM-issued instructions to detect transitions by the guest OS from its guest kernel mode to the guest user mode. As is known by persons skilled in the art, a transition by the guest to the user mode indicates that the driver for the device being emulated has completed its task, since device drivers run in an operating system's kernel mode. As a second possibility, the VMM, in particular the interrupt manager 355, by way of a respective CPU module 310, 312, 314, can infer interrupt safepoints by recognizing state transitions into an idle loop by a particular virtual processor. This second possibility may be used as a substitute for the detection of transitions from the guest kernel mode to the guest user mode, but the benefits of the invention are greater when the two approaches are used in combination.

Yet another way for the VMM to infer that a virtual CPU is at a safepoint would be for it to detect guest writes to emulated interrupt circuitry, such as a virtual APIC, since these actions indicate that the guest has switched from accessing one virtual device to another, has acquired a lock, etc. Alternatively, or in addition, the VMM could detect guest OS writes to a priority register, such as the task Priority Register found in Intel architectures, etc., since this indicates that the guest OS is changing the relative "importance" of guest threads. These alternatives, although more fine-grained than detecting transitions between the guest and user modes, or detecting transitions into an idle loop, may, depending on a given architecture, require knowledge of the guest state that is more readily available in para-virtualized systems.

In short, the VMM may detect any VM activity that indicates guest "interruptibility" and interpret this as the guest having reached a safepoint. Note that proper modification of the kernel of the guest OS in a para-virtualized system could enable the guest itself to signal (either on its own or by exposing some register or flag) its interruptibility, in all or in just some cases. This could reduce or eliminate the need for any specific detection activity on the part of the VMM other than detecting the interruptibility signal or detecting the state of the register/flag.

While the invention is not limited to use in particular processor architectures, one example of safepoint detection based on mode transitions is now described here in the context of Intel and AMD processor signaling: The x86 architecture implements "rings" of protection. The innermost ring involves operations at the kernel level (or mode); the outer rings are less secure and include running at the user level (or mode). Assume that a device driver is running. A transition to the user mode then indicates that the device driver has completed its task. A non-exhaustive list of instructions that may be used to infer an interrupt safepoint for x86 processor architectures includes IRET (interrupt return), LRET (long return), SYSEXIT, and SYSRET. Executing a HLT (halt) instruction is also an indication of an interrupt safepoint, since HLT instructions are generally placed in the idle loops of operating systems. A processor executing a HLT instruction enters a "wait" state that can be terminated only by an external interrupt. Executing the HLT instruction is therefore an indication that a processor has no further work and is available for an interrupt.

A PAUSE instruction is similar to the HLT instruction in that a processor enters a special wait state. However, unlike the HLT instruction, the processor stays in this wait state for a limited interval and can exit even in the absence of an external interrupt. Therefore, the PAUSE instruction is less reliable than the HLT instruction as an indicator of a safepoint; however, in general, spinning on the PAUSE instruction with interrupts enabled reliably indicates the availability to handle a completion interrupt.

The method(s) implemented for detection of safepoints will depend upon the specific VM technology. For example, detection performance is likely to be different for VMs based on binary translation as opposed to traditional trap-and-emulate implementation. In the binary translation case, a special code sequence comprising at least one instruction that signals the device emulation code may be provided at the beginning or end of the standard code sequence to emulate the instructions that are detected to infer interrupt safepoints. In the trap-and-emulate implementation, at the I/O initiation time, a subset of these instructions may be arranged to trap to the VMM 300 when executed at a later point.

Since all accesses to a local delay queue 302, 304 and 306 of FIG. 2 are by the uniquely associated VCPU 210, 212 and 214, there is no need to provide safeguards against concurrent accesses. On the other hand, the global delay queue 316 may be accessed in the context of different VCPUs, so that appropriate synchronization should be implemented. This may be accomplished using known programming techniques.

What is claimed is:

1. A computer program product embodied in a non-transitory computer readable storage medium and including program code executable in a computer system that includes at least one virtual machine that runs as a guest on a host hardware platform, that has a guest operating system and at least one virtual processor, and that submits I/O requests to at least one virtual device that corresponds to an emulated physical device, the program code implementing a method for virtualizing I/O completions by the virtual device, the method comprising:

backing the virtual device with a backing device;
   determining timing constraints of the emulated physical device, including a nominal I/O completion delay time;
   defining timing parameters for scheduling deliveries of completion interrupts during emulation of the physical device including at least partially basing the timing parameters on the timing constraints of the emulated physical device;
   detecting an actual I/O completion interrupt from the backing device;
   monitoring for a safepoint, that is, a point of execution of the virtual processor that indicates that the virtual processor is in a condition to receive the actual I/O completion interrupt;
   if a safepoint is detected that occurs before the nominal I/O completion delay time, dispatching the actual I/O completion interrupt upon detection of the safepoint, before the nominal I/O completion delay time;
   thereby enabling device emulation acceleration relative to limiting deliveries of said completion interrupt to a schedule that is based on said timing parameters alone.

2. The computer program product of claim 1, wherein the method further comprises dedicating a local delay queue to each virtual processor, each local delay queue holding time-stamped indications of completed I/O requests by the backing device.

3. The computer program product of claim 2, wherein the method further comprises providing a global delay queue indicating a most mature completed I/O request in each local delay queue.

4. The computer program product of claim 3, wherein the method further comprises:
   determining expiration of a nominal interrupt maturity time; and
   upon determining expiration of the nominal interrupt maturity time, dispatching a globally most mature completion interrupt indicated in the global delay queue.

5. The computer program product of claim 2, wherein the method further comprises:
   determining expiration of a nominal interrupt maturity time; and
   upon determining expiration of the nominal interrupt maturity time, scanning the local delay queues to determine a globally most mature completed I/O request, and dispatching a corresponding globally most mature completion interrupt.

6. The computer program product of claim 1 wherein the method further comprises:
   dedicating a local delay queue to each virtual processor, each local delay queue holding time-stamped indications of I/O requests completed by the backing device; and
   upon detection of the safepoint for anyone of the virtual processor(s), dispatching a most mature interrupt in the local delay queue corresponding to the virtual processor at the safepoint.

7. The computer program product of claim 1 in which:
   the virtual machine is a uni-processor virtual machine; and
   there is a single local delay queue.

8. The computer program product of claim 1 in which the virtual machine is a multi-processor virtual machine, the method further including uniquely associating each of a plurality of local delay queues with a corresponding one of the virtual processors.

9. The computer program product of claim 1, in which:
   the virtual machine executes in different execution modes, including a guest operating system kernel mode and a user mode; and
   the step of detecting the safepoint comprises sensing a transition in the guest between execution modes.

10. The computer program product of claim 1, in which:
   the guest operating system has a guest kernel; and
   the step of detecting the safepoint comprises detecting when the guest kernel enters an idle loop.

11. The computer program product of claim 1, in which the step of detecting the safepoint comprises detecting when the guest operating system writes to emulated interrupt circuitry.

12. The computer program product of claim 1, in which the step of detecting the safepoint comprises detecting when the guest operating system writes to an emulated priority register.

13. The computer program product of claim 1, in which the virtual machine is para-virtualized.

14. The computer program product of claim 1, wherein the method further comprises providing the guest operating system with a mechanism for actively indicating that the virtual processor is at a safepoint, whereby the step of detecting the safepoint comprises sensing this active indication.

15. The computer program product of claim 1, wherein the virtual device is an emulation of a computer peripheral.

16. The computer program product of claim 1, wherein the step of determining said timing constraints of the physical device includes modeling of device latencies and throughputs.

* * * * *